US009729395B2

(12) United States Patent
Anantharaman et al.

(10) Patent No.: US 9,729,395 B2
(45) Date of Patent: *Aug. 8, 2017

(54) COLLABORATIVE CONFERENCE EXPERIENCE IMPROVEMENT

(71) Applicant: MICROSOFT TECHNOLOGY LICENSING, LLC, Redmond, WA (US)

(72) Inventors: Sundar Anantharaman, Redmond, WA (US); Rajesh Ramanathan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/733,563

(22) Filed: Jun. 8, 2015

(65) Prior Publication Data

US 2015/0271020 A1 Sep. 24, 2015

Related U.S. Application Data

(63) Continuation of application No. 13/626,641, filed on Sep. 25, 2012, now Pat. No. 9,055,155, which is a (Continued)

(51) Int. Cl.
*H04N 7/15* (2006.01)
*H04L 12/24* (2006.01)
(Continued)

(52) U.S. Cl.
CPC ........ *H04L 41/0816* (2013.01); *H04L 65/403* (2013.01); *H04L 65/80* (2013.01);
(Continued)

(58) Field of Classification Search
CPC ....................................................... H04N 7/15
See application file for complete search history.

(56) References Cited

U.S. PATENT DOCUMENTS

| 6,556,670 B1 | 4/2003 | Horn |
| 6,584,489 B1 | 6/2003 | Jones et al. |
(Continued)

OTHER PUBLICATIONS

Improving Audio Conferencing: Are Two Ears Better than One?, research.sun.com/projects/mc/audio/cscw2006.pdf, Nov. 2006, pp. 1-10.

*Primary Examiner* — Creighton Smith
(74) *Attorney, Agent, or Firm* — Merchant & Gould (57) ABSTRACT

An example computing device creates a resource module that acquires resource information relating to resources of the computing device and acquire quality of experience information corresponding to a quality of audio, and creates a roster module that displays a participant list including resource information relating to resources of a plurality of other computing devices connected to the teleconference and display quality of experience information corresponding to a quality of audio a user of each of the plurality of other computing devices experiences when connected to the teleconference. The device also creates a policy module configured to evaluate the resource information and quality of experience information acquired by the client resource module against rules of a teleconference policy and implement actions based on a determination that the computing device is non-compliant with one or more of the rules of the teleconference policy to control quality of audio during the teleconference.

20 Claims, 8 Drawing Sheets

Related U.S. Application Data continuation of application No. 12/722,592, filed on Mar. 12, 2010, now Pat. No. 8,275,843.

(51) Int. Cl.
    *H04M 3/56*     (2006.01)
    *H04L 29/06*    (2006.01)
    *H04M 3/22*     (2006.01)

(52) U.S. Cl.
    CPC ............ *H04M 3/56* (2013.01); *H04M 3/568* (2013.01); *H04N 7/15* (2013.01); *H04M 3/2227* (2013.01)

(56)             References Cited

U.S. PATENT DOCUMENTS

| | | |
|---|---|---|
| 7,487,211 B2 | 2/2009 | Beavers et al. |
| 8,275,843 B2 | 9/2012 | Anantharaman et al. |
| 2007/0086366 A1 | 4/2007 | Luo et al. |
| 2008/0069011 A1 | 3/2008 | Sekaran et al. |
| 2008/0101557 A1 | 5/2008 | Boss et al. |
| 2009/0080632 A1 | 3/2009 | Zhang et al. |
| 2009/0094029 A1 | 4/2009 | Koch et al. |
| 2009/0168984 A1 | 7/2009 | Kreiner et al. |
| 2009/0179983 A1 | 7/2009 | Schindler |

COLLABORATIVE CONFERENCE EXPERIENCE IMPROVEMENT

CROSS-REFERENCE TO RELATED APPLICATIONS

This application is a continuation of U.S. Ser. No. 13/626,641, entitled COLLABORATIVE CONFERENCE EXPERIENCE IMPROVEMENT, filed on Sep. 25, 2012, and assigned U.S. Pat. No. 9,055,155, which is a continuation application of U.S. Ser. No. 12/722,592, entitled COLLABORATIVE CONFERENCE EXPERIENCE IMPROVEMENT, filed on Mar. 12, 2010, and now U.S. Pat. No. 8,275,843, which are incorporated herein by reference in their entirety.

BACKGROUND

When joining a teleconference, participants often do so with a wide range of devices and different types of connections. This may lead to quality issues that arise due to the presence of one or more contributing sources of audio. In such scenarios, impaired signals are broadcast to all participants, often making the teleconference difficult or impossible to conduct. Remote participants are often asked to manually mute their devices or drop off from a teleconference in an attempt to address such issues.

SUMMARY

The present disclosure is directed to systems and methods for controlling the quality of audio of a conference in a computing system environment.

In one aspect, a computing device includes a processing unit, and a system memory connected to the processing unit, the system memory including instructions that, when executed by the processing unit, cause the processing unit to: create a resource module configured to acquire resource information relating to resources of the computing device and acquire quality of experience information corresponding to a quality of audio a user of the computing device experiences when the computing device is connected to a conference; create a roster module configured to display a participant list including resource information relating to resources of a plurality of other computing devices connected to the conference and display quality of experience information corresponding to a quality of audio a user of each of the plurality of other computing devices experiences when connected to the conference; and create a policy module configured to evaluate the resource information and quality of experience information acquired by the client resource module against rules of a conference policy and implement actions based on a determination that the computing device is non-compliant with one or more of the rules of the conference policy to control quality of audio during the conference.

In another aspect, a method for controlling quality of audio of a teleconference in a computing system environment, the method including: receiving a self-configuration message from one or more of a plurality of remote computing devices connected to the teleconference, wherein each self-configuration message includes resource information related to hardware resources, software resources, and network resources of a corresponding remote computing device and quality of experience information related to a quality of audio a user of the corresponding computing device experiences during the teleconference; evaluating each self-configuration message to determine if the plurality of resource information and quality of experience information is compliant with one or more rules of a teleconference policy; generating an aggregate roster message including at least a portion of the plurality resource information and quality of experience information of each remote computing device evaluated as including resource information and quality of experience information compliant with the one or more rules of the teleconference policy; and sending the aggregate roster message to one or more of the remote computing devices connected to the teleconference.

In yet another aspect, a computer readable storage medium has computer-executable instructions that, when executed by a computing device, cause the computing device to perform steps including: receiving a self-configuration message via an extensible teleconference communication protocol from each of a plurality of remote computing devices connected to a teleconference, wherein each self-configuration message includes a plurality of resource information relating to hardware resources, software resources, and network resources of a corresponding remote computing device and quality of experience information including parameters including echo, jitter, and mean opinion score that are related to a quality of audio and quality of experience information including parameters related to a quality of video a user of the corresponding computing device experiences during the teleconference; evaluating each self-configuration message to determine if the plurality of resource information and quality of experience information is compliant with one or more rules of a teleconference policy; implementing an action to preserve the quality of audio during the teleconference to each remote computing device evaluated as including resource information and quality of experience information non-compliant with the one or more rules of the teleconference policy, the action selected from a group including: muting a remote computing device; disconnecting a remote computing device from the teleconference; and sending suggestions to a remote computing device including optimization suggestions; generating an aggregate roster message including at least a portion of the plurality resource information and quality of experience information of each remote computing device evaluated as including resource information and quality of experience information compliant with the one or more rules of the teleconference policy; inserting the aggregated roster message into one or more rich media data packets; and sending the aggregate roster message to one or more of the remote computing devices connected to the teleconference.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed to systems and methods for controlling the quality of audio of a conference in a computing system environment.

In example embodiments provided herein, capabilities and audio quality of each endpoint of a conference such as a teleconference, a conference with application and/or desktop sharing, and other types of conferences, are shared and displayed with other respective endpoints via a conferencing roster. The conferencing roster is additionally used to implement automatic control of audio via aggregate quality reports from each endpoint. The quality reports can, in some examples, be utilized to trigger one or more actions that improve the quality of the conferencing experience.

The following example embodiments are described herein with respect to one or more components of the Microsoft Unified Communications solution from Microsoft Corporation of Redmond, Wash. However, the systems and methods of the present disclosure can be applicable to any situation in which it is desirable to preserve the quality of one or more parameters of a teleconference in a computing system environment.

Figure 1:
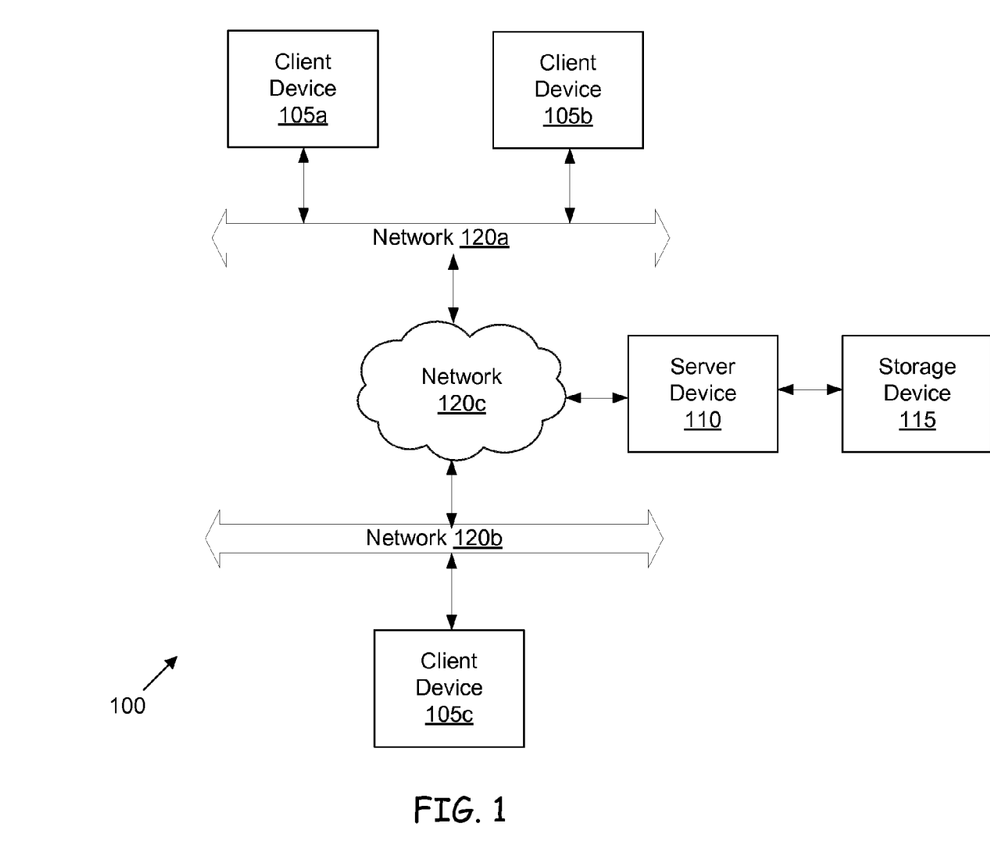
FIG. 1 shows an example networked computing system.

FIG. 1 shows an example networked computing environment 100. The example environment 100 includes a plurality of client devices 105a-c (collectively, client devices 105), a server device 110, and a storage device 115. Additionally, the example environment 100 includes a first network 120a, a second network 120b, and a third network 120c (collectively, network 120). However, other embodiments are possible as well. For example, the networked computing environment 100 may generally include more or fewer devices, networks, and other components as desired.

The client devices 105 and the server device 110 are general purpose computing devices, such as described below with reference to FIG. 2. In example embodiments, the server device 110 is a business server that implements business processes. Example business processes include real-time communications and collaboration processes, data management processes, and others. Office Communications Server from Microsoft Corporation of Redmond, Wash. is an example of a business server that implements real-time communications and collaboration processes in support of instant messaging, file transfer, peer-to-peer and multiparty voice and video calling, ad hoc and structured conferences, public switched telephone network (PSTN) connectivity, and others. In some embodiments, the server device 110 includes a plurality of interconnected server devices operating together to implement business processes. Other embodiments of the server device 110 are possible.

The storage device 115 is a data storage device, such as a relational database or any other type of persistent data storage device. The storage device 115 stores data in a predefined format such that the server device 110 can query, modify, and manage data stored thereon. Examples of such a data storage device include data stores configured to store presence information, in-band provisioning settings, address book data and services such the ACTIVE DIRECTORY® directory service from Microsoft Corporation. In some embodiments, the storage device 115 includes a plurality of data storage devices logically grouped together in an interconnected "Farm" configuration. Other embodiments of the storage device 115 are possible.

The network 120 is a bi-directional data communication path for data transfer between one or more devices. In the example embodiment, the first network 120a establishes a communication path for data transfer between the client devices 105a-b and the server device 110 via the third network 120c. The second network 120b establishes a communication path for data transfer between the client device 105c and the server device 110 via the third network 120c.

Each of the respective networks 120a-c can be of any of a number of wireless or hardwired WAN, LAN, Internet, or other packet-based communication networks such that data can be transferred among the elements of the example environment 100. In this manner, each of the respective networks 120a-c may display unique characteristics with respect to performance and quality. Other embodiments of the network 120 are possible.

Figure 2:
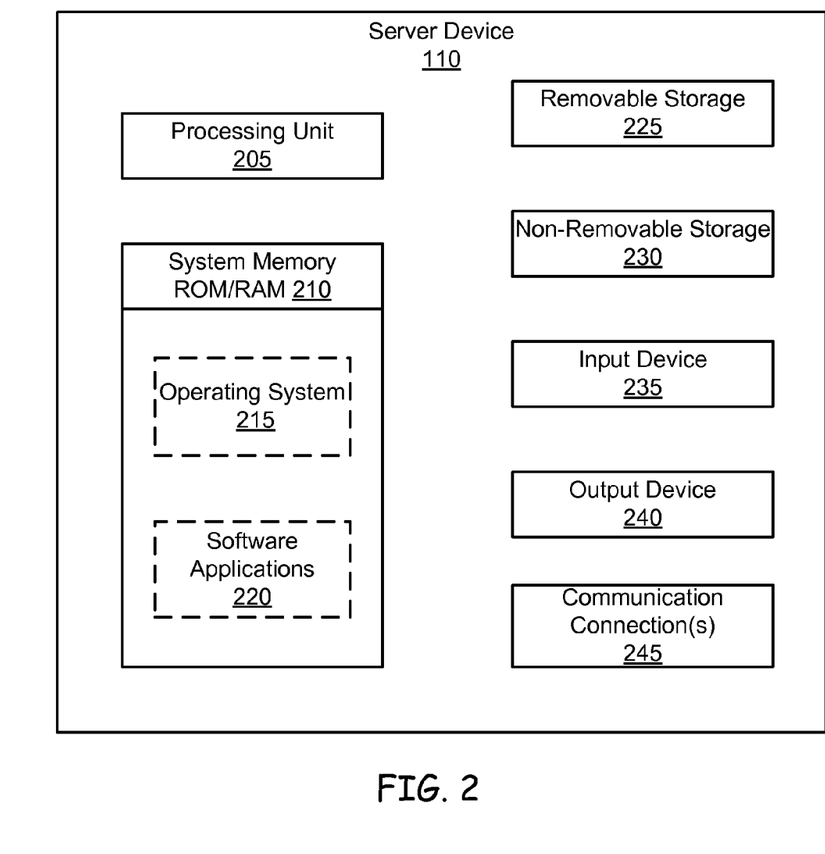
FIG. 2 shows an example server device from the system of FIG. 1.

Referring now to FIG. 2, the server device 110 of FIG. 1 is shown in further detail. As mentioned above, the server device 110 is a general purpose computing device. Example general purpose computing devices include a desktop computer, laptop computer, personal data assistant, smartphone, and other computing devices.

The server device 110 includes at least one processing unit 205 and system memory 210. The system memory 210 can store an operating system 215 for controlling the operation of a computing device. One example operating system 215 is the WINDOWS® operating system from Microsoft Corporation, or a server, such as Office Communications Server, also from Microsoft Corporation.

The system memory 210 may also include one or more software applications 220 and may include program data. Software applications 220 may include many different types of single and multiple-functionality programs, such as an electronic mail program, a calendaring program, an Internet browsing program, a spreadsheet program, a program to track and report information, a word processing program, an instant messaging program, a web conferencing service program, and many others. One example program is the OFFICE® suite of applications from Microsoft Corporation. Other example programs include the Office Communicator client and the Office Live Meeting client, both also from Microsoft Corporation.

The system memory 210 can include computer readable media. Examples of computer readable media include computer readable storage media and communications media.

Computer readable storage media include physical media such as, for example, magnetic disks, optical disks, or tape. Such additional storage is illustrated in FIG. 2 by removable storage 225 and non-removable storage 230. Computer readable storage media can include physical volatile and nonvolatile, removable and non-removable media implemented in any method or technology for storage of information, such as computer readable instructions, data structures, program modules, or other data. Computer readable storage media can also include, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by server device 110. Any such computer storage media may be part of or external to the server device 110.

Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 110 can also have any number and type of input devices 235 and output devices 240. Example input devices 235 include a keyboard, mouse, pen, voice input device, touch input device, and others. Example output devices 240 include a display, speakers, printer, and others. The server device 110 can also include a communication connection 245 configured to enable communications with other computing devices over a network (e.g., network 120) in a distributed computing environment.

In example embodiments, the client devices 105 of FIG. 1 are configured similar to the server device 110 as described above.

Figure 3:
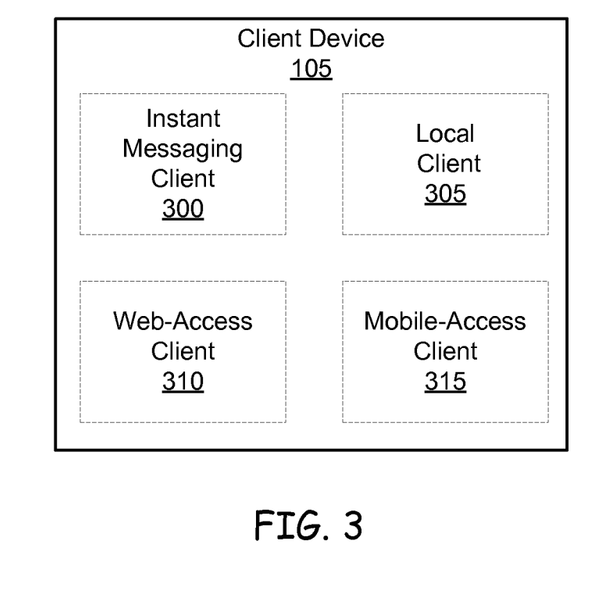
FIG. 3 shows example software applications of client devices of FIG. 1.

Referring now additionally to FIG. 3, the client devices 105 are also configured to include one or more different types of software applications that interact with functionality and services of the server device 110 during a teleconference as managed by the server device 110. Example software applications include an instant messaging client 300, a local client 305, a web-access client 310, and a mobile-access client 315. Other types of software applications are possible as well.

The example instant messaging client 300 is configured as a dedicated messaging and conferencing service software application that interacts with real-time communications and collaboration processes of the server device 110. The instant messaging client 300 further integrates with a suite of software applications executing on a respective client device. In one embodiment, the instant messaging client 300 includes the Office Communicator client from Microsoft Corporation, which is an instant messaging client used with Office Communications Server. The Office Communicator client enables a user to communicate and collaborate with other users via instant messaging, voice, desktop sharing and video, and other communication modalities during a teleconference as managed by the server device 110. The Office Communicator client integrates with programs of the OFFICE® suite of programs. Other embodiments of the instant messaging client 300 are possible as well.

The example local client 305 is a stand-alone software application configured to connect to on-line teleconference meetings hosted by the server device 110. In one embodiment, the local client 305 includes the Office Live Meeting client of the Microsoft Office Live Meeting local web conferencing service operated by Microsoft Corporation. However, other embodiments of the local client 305 are possible.

The example web-access client 310 is configured to access the server device 110 remotely using a network connection, such as the Internet. In one embodiment, the web-access client 310 is the Microsoft Communicator Web Access service of Office Communications Server. In the example embodiment, a respective client device uses a web browser to connect to Office Communications Server via the Communicator Web Access service. This brings up a user interface similar to an interface of the Office Communicator client in which a user can leverage the aforementioned capabilities of Office Communications Server. Other embodiments of the web-access client 310 are possible.

The example mobile-access client 315 is another type of software application configured to interact with various functionality and services of the server device 110. In one embodiment, the mobile access client 315 includes the Office Communicator Mobile application of Office Communications Server. The Office Communicator Mobile application provides a real-time presence information, single number reach support and rich instant messaging capability via a user interface similar to an interface of the Office Communicator client. In this manner, a user operating a mobile device can leverage aforementioned capabilities of Office Communications Server. Example mobile devices include a cellular telephone, a smartphone, a personal digital assistant, and others. Other embodiments of the mobile-access client 315 are possible as well.

Figure 4:
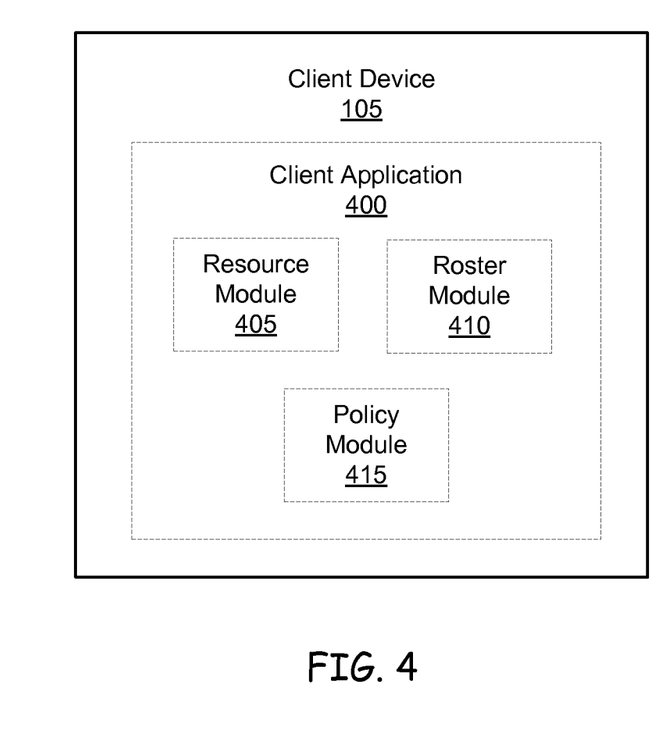
FIG. 4 shows example logical modules of the software applications of FIG. 3.

Referring now to FIG. 4, example logical modules of an example client application 400 executing on the client devices 105 of FIG. 1 are shown. In example embodiments, the client application 400 is configured similar to the instant messaging client 300, local client 305, web-access client 310, and mobile-access client 315 described above in connection with FIG. 3. In this manner, the example client application 400 is configured to interact with various functionality and services of the server device 110 during a teleconference as managed by the server device 110.

The example client application 400 includes a client resource module 405, a client roster module 410, and a client policy module 415.

The example client resource module 405 includes logical modules of software executing on the client device 105 that enables the client application 400 to accomplish one or more of the following: a) acquire resource information related to type, configuration, and performance of resources of the client device 105; and b) acquire quality of experience information related to a quality of audio that a user of the respective client device 105 experiences during a teleconference as managed by the server device 110. In general, the client resource module 405 is configured such that acquisition of resource information and quality of experience information may be automatic or manual, and further may be periodic or on-demand as desired.

Example resources of the client device 105 include hardware resources, software resources, network resources, and others. Example hardware resource information includes information related to type, configuration, and performance of physical components of the client device 105. Example physical components include a monitor, motherboard, CPU, chip set, video card, audio card, power supply, memory, peripheral devices, microphone, speakers, and others. An example of a type, configuration, and performance of a physical component of the client devices 105, such as the CPU for example, may include parameters such as processor specification, processor code name, core speed, bus speed, processor load, and many others.

Example software resource information includes information related to type, configuration, and performance of software components of the client device 105. Example software components include an installed operating system, installed software applications, and others. An example of a type, configuration, and performance of a software component of the client devices 105, such as an installed software application for example, may include parameters such as application version number, application name, application memory usage, and many others.

Example network resource information includes information related to type, configuration, and performance of a network and network connection of the client device 105, such as for example, connection name, available bandwidth, network protocol, architecture, messaging format, and others.

In general, resource information may include unique parameters and aggregate parameters related to type, configuration, and performance of a respective resource of the client devices 105. An example unique parameter may include a parameter that specifies whether an audio card is compatible or approved to be used in a teleconference managed by Office Communications Server (e.g., UC certified). An example non-approved resource includes a third party resource configured for use with a different product, and new or legacy hardware not currently being used in contemporary computing devices. Such non-approved devices being designated as not approved for use in a teleconference managed by Office Communications Server (e.g., UC certified) or other server products. Still other non-approved resources are possible as well.

An example aggregate parameter may include a composite score or number which measures overall performance characteristics and capabilities of resources of the client device 105. A WINDOWS® Experience Index (WEI) score for the WINDOWS® Vista or WINDOWS® 7 operating systems from Microsoft Corporation is one example of such an aggregate parameter. Other unique parameters and aggregate parameters related to type, configuration, and performance of a respective resource of the client devices 105 are possible as well. For example, in some embodiments, the unique parameters and aggregate parameters at least correspond to device capability and device health of the client devices 105. An example device capability parameter includes a parameter specifying whether a client device 105 is configured for high definition (HD) quality audio and video. Still other embodiments of device capability are possible. An example device health parameter included includes one or more parameters specifying results of a self-diagnostic test executed by a respective client device 105. Still other embodiments of device health are possible.

Quality of experience information includes parameters that reflect quality of audio of a teleconference session. Example quality of experience information includes information related, echo (i.e., a reflection of sound, arriving at the listener some time after the direct sound), jitter (i.e., distortion caused by lack of synchronization), mean opinion score (MOS) (i.e., a numerical indication of the perceived quality of received media after compression and/or transmission, expressed as a single number in the range one to five), and any other perceived and/or measured metrics that reflect quality of audio of a teleconference such as, for example, packet loss in a network, network quality, wireless connection strength of a device, sent frame rate, received frame rate, and others. Still other information relating to teleconference quality of experience information are possible as well. For example, in some embodiments, quality of experience information includes parameters that reflect quality of video of a teleconference session. In still other embodiments, quality of experience information includes parameters that reflect quality of experience in a conference session including whiteboarding, application sharing, desk sharing, note taking, document sharing, and others.

In example embodiments, the client resource module 405 is additionally configured to encode acquired resource information and quality of experience information within a self-configuration message and subsequently transfer the self-configuration message to a server device (e.g., server device 110) during a teleconference, such as described in further detail below with respect to FIG. 5.

The example client roster module 410 includes logical modules of software executing on each of the respective client devices 105 that enable the client application 400 to receive and process an aggregate roster message received from the server device 110 during a teleconference. As described in further detail below with respect to FIG. 5, the aggregate roster message can include resource information (e.g., type, configuration, and performance information) and quality of experience information corresponding to each of a plurality of client devices participating in a teleconference.

In one aspect, the client roster module 410 is configured to selectively display a participant list including information contained with the aggregate roster message to one or more users of a respective client device 105 (e.g., client device 105*a*) via the client application 400. In this manner, the participant list contains, along with a rich roster display of teleconference participants, information about resources and quality of experience (e.g., echo, jitter, MOS score, UC certification, location of a client device 105 including network coordinates, whether a remote client device is running on battery power, and other information) of all respective client devices 105 participating in a teleconference. An example participant list 800 is described below with respect to FIG. 8. Other embodiments of the client roster module 410 are possible as well.

The example client policy module 415 includes logical modules of software executing on the client device 105 that enable the client application 400 to evaluate the self-configuration message acquired by the client resource module 405 and the aggregate roster message acquired by the client roster module 410 against one or more rules of a teleconference policy, and further implement actions based on which of the one or more rules are not met. In this manner, the client policy module 415 is configured to automatically trigger actions to provide and/or preserve a desired quality of audio during a teleconference.

Example rules correspond to pre-defined requirements and thresholds with respect to the resource information and quality of experience information contained within the self-configuration message and the aggregate roster message, such as, for example, rules related to jitter, MOS score, UC certification, and others. Example actions are implemented based on which of the requirements and thresholds are not met (e.g., non-compliant) and may include a recommendation for optimizing teleconferencing experience such as automatically muting one or more client devices 105 participating in a teleconference, detecting potential loopback based on location of client devices 105, or otherwise suggest optimizations to the teleconference such as volume control, sharing computing resources from client devices 105 at a similar location (e.g., client device 105*a* of FIG. 1 runs video of a teleconference and client device 105*b* runs audio from the teleconference). Other embodiments of the client policy module 415 are possible as well.

Figure 5:
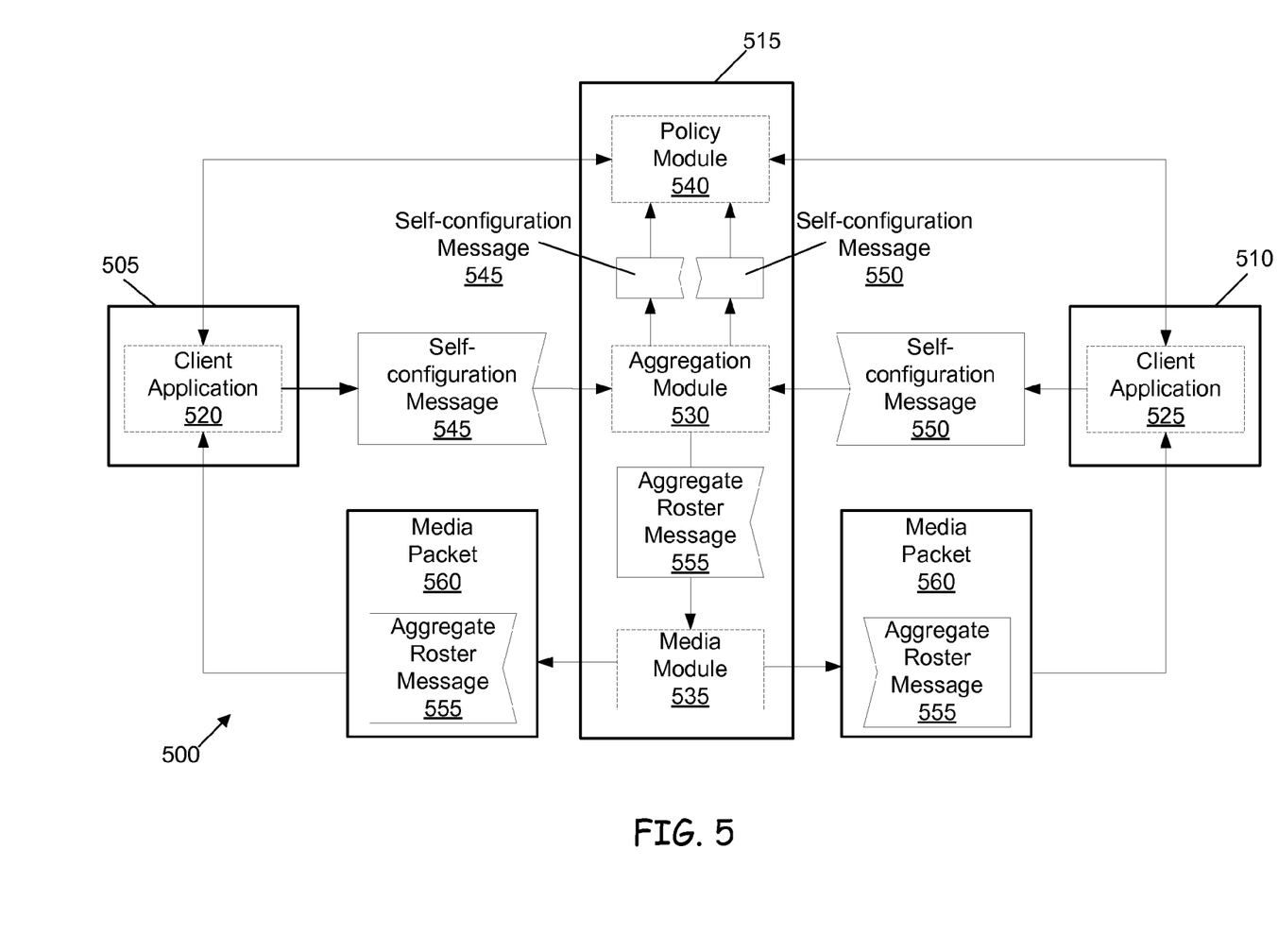
FIG. 5 shows example communications between example client devices and an example server device.

Referring now to FIG. 5, a schematic block diagram 500 illustrates example communications between example client devices and an example server device in accordance with the present disclosure. The example diagram 500 includes a first client device 505, a second client device 510, and a server device 515. However, other configurations are possible as well. For example, the schematic block diagram 500 may generally include more or fewer client devices, server devices, and other components as desired.

The first client device 505, the second client device 510, and the server device 515 are configured similar to the respective client devices 105 and server device 110 described above with respect to FIG. 1 and FIG. 2. In the example shown, the first client device 505 includes a first client application 520, and the second client device 510 includes a second client application 525. The first client application 520 and the second client application 525 are configured similar to the example client application 400 described above with respect to FIG. 3 and FIG. 4.

In example embodiments, the server device 515 is configured to manage a teleconference in which one or more respective participants interact with the first client device 505 and the second client device 510 to communicate and collaborate with each other via instant messaging, voice, desktop sharing and video, and any other communication modalities. The server device 515 is also configured to improve the quality of the teleconferencing experience for the one or more participants of the first client device 505 and the second client device 510 by aggregating and sharing reports from each of the first client device 505 and the second client device 510 for triggering of actions that improve the quality of the teleconferencing experience. In general, the actions may be either manual or automatic and may be triggered by functionality of the respective first client application 520 and the second client application 525 (i.e., client policy module 415) and by functionality of the server device 515, as described in further detail below.

The example server device 515 includes an aggregation module 530, a media module 535, and a server policy module 540.

The example aggregation module 530 includes logical modules of software executing on the server device 515 that enable the server device 515 to receive and process a first self-configuration message 545 as sent from the first client application 520 and a second self-configuration message 550 as sent from the second client application 525. In some embodiments, the first self-configuration message 545 is an XML formatted message including resource information related to type, configuration, and performance of resources of the first client device 505. The first self-configuration message 545 further includes quality of experience information related to a quality of audio that the one or more respective participants interacting with the first client device 505 experiences during the teleconference.

Similarly, in example embodiments, the second self-configuration message 550 is an XML formatted message including resource information related to type, configuration, and performance of resources of the second client device 510. The second self-configuration message 550 further includes quality of experience information related to a quality of audio that the one or more respective participants interacting with the second client device 510 experiences during the teleconference.

In some embodiments, the first self-configuration message 545 and the second self-configuration message 550 are transferred to the aggregation module 530 according to a designated extensible protocol. One example extensible protocol is the Centralized Conferencing Control Protocol (C3P) used by Office Communications Server used to control and manage the teleconference. In this manner, respective schema of the first self-configuration message 545 and the second self-configuration message 550 may modified via extensions to include any resource and quality related parameters as desired.

The example aggregation module 530 is configured to consolidate the first self-configuration message 545 and the second self-configuration message 550 into an aggregate roster message 555. In this manner, the aggregate roster message 555 includes resource information (e.g., type, configuration, and performance information) and quality of experience information corresponding to each of the first client device 505 and the second client device 510. In some embodiments, the aggregate roster message 555 is a XML formatted message. However, other embodiments are possible as well.

The example media module 535 includes logical modules of software executing on the server device 515 that enable the server device 515 to transfer rich media to the first client application 520 and the second client application 525, thereby permitting the first client device 505 and the second client device 510 to communicate and collaborate with each other during the teleconference, as mentioned above. In example embodiments, the media module 535 is additionally configured to receive the aggregate roster message 555 from the aggregation module 530 and insert the aggregate roster message 555 into one or more rich media packets 560. In some embodiments, the rich media packets are RTCP media packets. In this manner, the aggregate roster message 555 is inserted within an RTCP channel for transfer to the first client application 520 and the second client application 525, along with the rich media. However, other embodiments are possible as well.

The example server policy module 540 includes logical modules of software executing on the server device 515 that enable the server device 515 to evaluate the first self-configuration message 545 and the second self-configuration message 550 against one or more rules of a teleconference policy, and further implement actions based on which of the one or more rules are not met. In this manner, the server policy module 540 is configured to automatically trigger actions to provide and/or preserve a desired quality of audio during the teleconference, similar to the client policy module 415 described above.

Example rules correspond to pre-defined requirements and thresholds with respect to the resource information and quality of experience information contained the first self-configuration message 545 and the second self-configuration message 550, such as, for example, rules related to jitter, MOS score, UC certification, and others. Example actions are implemented based on which of the requirements and thresholds are not met and may include a recommendation for optimizing teleconferencing experience such as automatically muting one or more of the first client device 505 and the second client device 510, detecting potential loop-back based on location of the first client device 505 and the second client device 510, or otherwise suggest optimizations to the first client device 505 and the second client device 510 such as to adjust volume control. Still other example actions are possible as well.

For example, a mediator of the teleconference may directly specify that one or more client devices (e.g., the first client device 505) is to be muted. In the example embodiment, the server policy module 540 would receive such a designation directly from a client application (e.g., first client application 520) and implement the action directly on the server device 515. Still other embodiments are possible as well.

Figure 6:
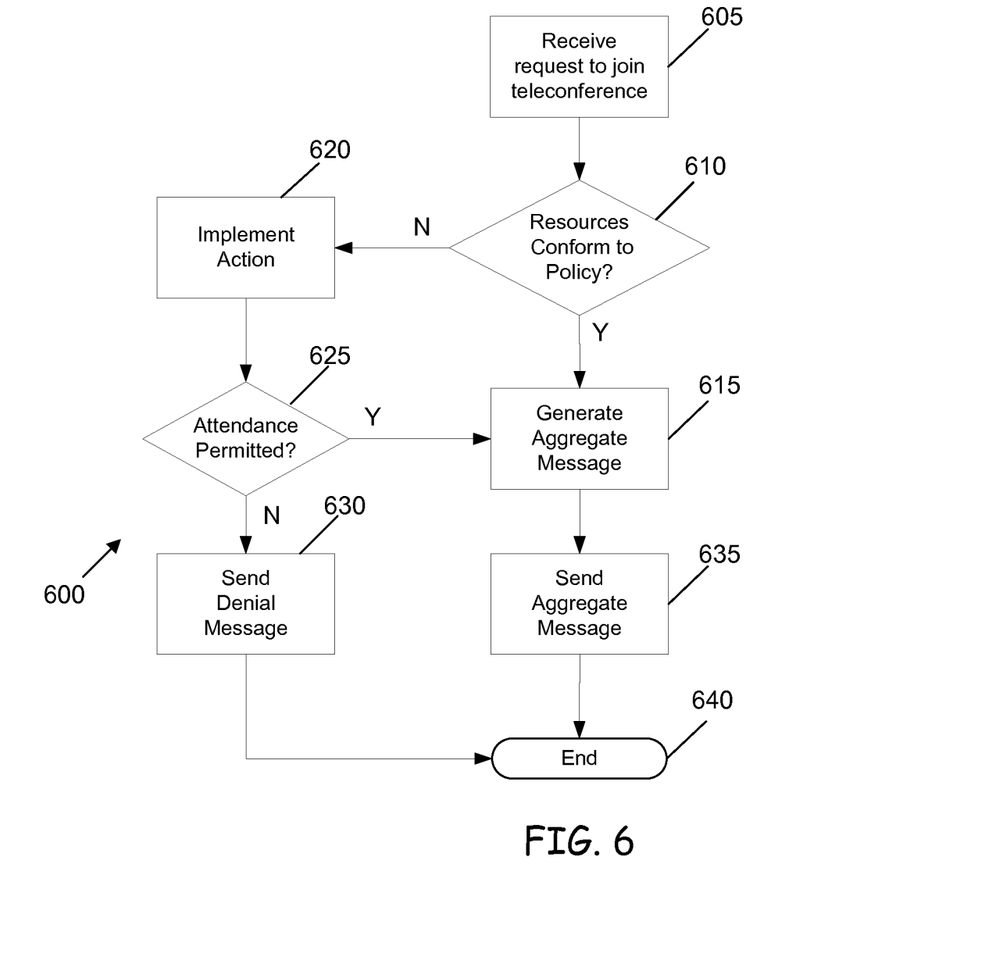
FIG. 6 shows a flowchart for an example method for registering a new client device in a teleconference.

Referring now to FIG. 6, an example method 600 for registering a new client device in a teleconference is shown according to the principles of the present disclosure. In example embodiments, the example method 600 is implemented on a server device configured similar to the server device 515 described above in connection with FIG. 5. However, other embodiments are possible as well.

The example method 600 begins at an operation 605, at which the server device receives a request from the client device to join the teleconference. In example embodiments, the client device is configured similar to the first client device 505 and the second client device 510 described above in connection to FIG. 5. However, other embodiments are possible as well. In the example embodiment, the request includes an XML formatted self-configuration message including at least resource information related to type, configuration, and performance of resources of the client device.

Operational flow then proceeds to an operation 610. At operation 610, the self-configuration message is evaluated to determine if the resources of the client device conform to one or more rules of a teleconference policy. If it is determined that the resources of the client device do conform to all rules of the teleconference policy, operational flow branches to an operation 615, at which an aggregate roster message is generated, as described further below.

If it is determined that the resources of the client device do not conform to all rules of the teleconference policy, operational flow branches to an operation 620, at which an action is implemented based on which of one or more rules of the teleconference policy are not met by the resources of the client device. Example actions include muting the client device, denying the client device connection to the teleconference, sending suggestions to the client device including potential optimizations to preserve quality of audio during the teleconference, and others.

Next, at an operation 625, it is determined whether the action to be implemented corresponds to denying the client device connection to the teleconference. If it is determined that the client device is not permitted connection to the teleconference, operational flow branches to an operation 630, at which a message is sent to the client device from the server device indicating that the client device may not be used to join the teleconference. Operational flow then proceeds to an end operation 640 which corresponds to termination of the method 600.

If it is determined that the client device is permitted to connect to the teleconference, operational flow branches to the operation 615, at which an aggregate roster message is generated in which the resource information of the client device is inserted into the aggregate roster message along with resource information and quality of experience information corresponding to each of a plurality of other client devices connected to the teleconference. Next, at an operation 635, the aggregate roster message is sent to all client devices connected to the teleconference. Operational flow then proceeds to the end operation 640.

Figure 7:
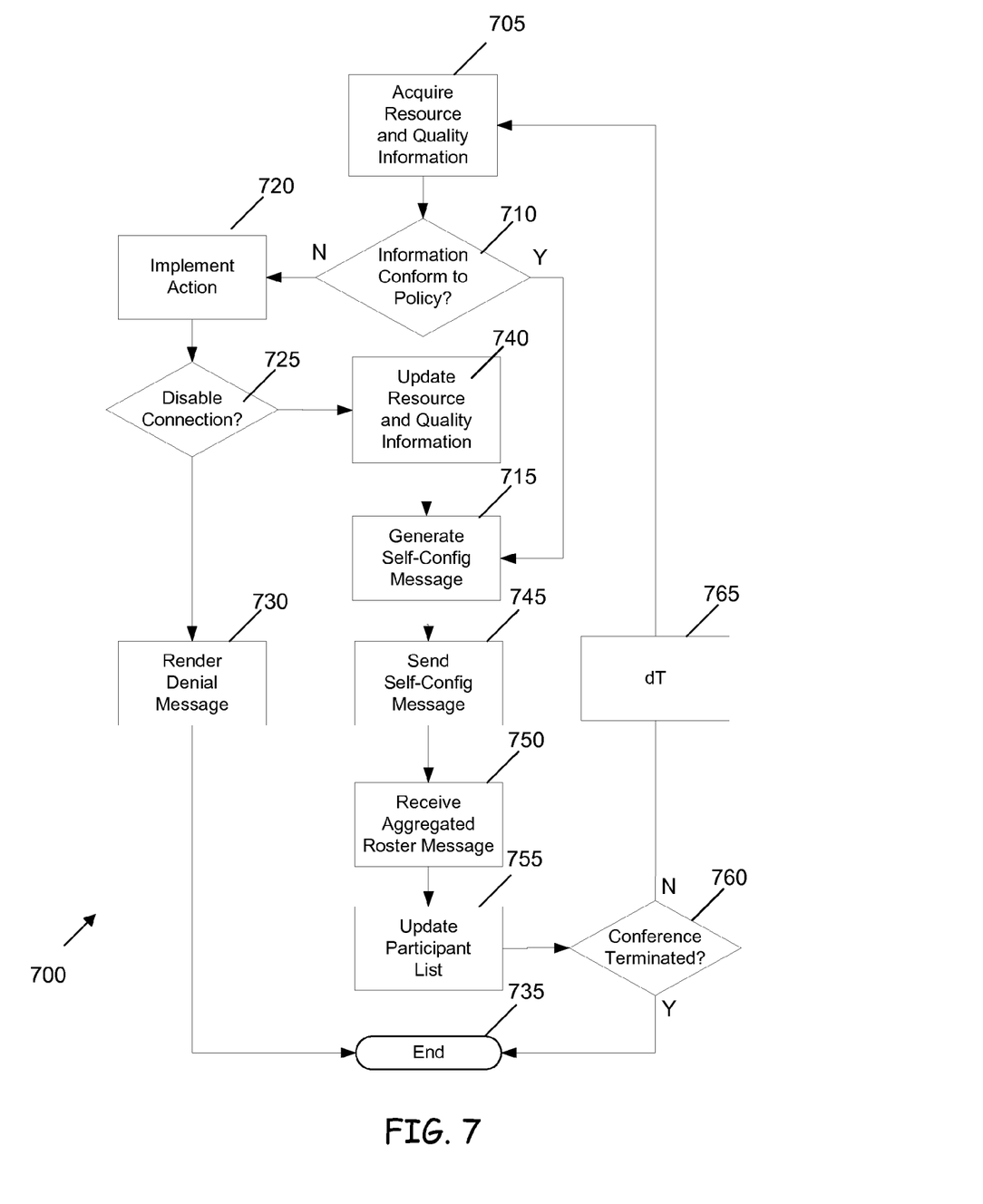
FIG. 7 shows a flowchart for an example method for updating a participant list of a client application with shared resource information and quality of experience information during a teleconference.

Referring now to FIG. 7, an example method 700 for updating a participant list of a client application with shared resource information and quality of experience information during a teleconference is shown. In example embodiments, the method 700 is implemented by a client application executing on a client device similar to the client devices described above in connection with FIGS. 1-5. However, other embodiments are possible as well.

The example method 700 begins at an operation 705, at which the client application acquires resource information related to type, configuration, and performance of resources of the client device, and further acquires quality of experience information related to a quality of audio that a user of the client device experiences during the teleconference.

Operational flow then proceeds to an operation 710. At operation 710, the acquired resource information and quality of experience information is evaluated against rules of a teleconference policy. In examples, the rules of the teleconference are obtained by the client upon the client's request to join the teleconference, or the rules can be pre-loaded on the client.

If it is determined that the resource information and quality of experience information conforms to all rules of the teleconference policy, operational flow branches to an operation 715 in which a self-configuration message is generated, as described further below.

If it is determined that the resource information and quality of experience information do not conform to all rules of the teleconference policy, operational flow branches to an operation 720, at which an action is implemented based on which of one or more rules of the teleconference policy are not met by the resource information and quality of experience information. Example actions include muting the client device, disabling connection of the client device to the teleconference, displaying suggestions to a user of the client device via the client application including potential optimizations to preserve quality of audio during the teleconference, and others.

Next, at an operation 725, it is determined whether the action of operation 720 requires disabling connection of the client device to the teleconference. If it is determined that the client device is to be disconnected from the teleconference, operational flow branches to an operation 730 in which a message is rendered by the client application for display to the user indicating that the client device is to be disconnected from the teleconference. Operational flow then proceeds to an end operation 735, which corresponds to disconnection of the client device from the teleconference and termination of the method 700.

If it is determined at operation 725 that the action at operation 720 does not correspond to disabling connection of the client device to the teleconference, operational flow branches to an operation 740 in which the resource information and quality of experience information acquired at operation 705 is updated to reflect the action implemented at operation 720.

Next, at operation 715, the self-configuration message is generated containing current resource information and quality of experience information of the client device. Operational flow then proceeds to an operation 745 in which the self-configuration message is sent to a server device configured to manage the teleconference, such as the server device 515 described above with respect to FIG. 5.

Next, at operation 750, an aggregate roster message is received at the client device from the server device. In example embodiments, the aggregate roster message includes resource information and quality of experience information corresponding to each of a plurality of client devices connected to the teleconference. Operational flow then proceeds to an operation 755, at which the participant list is updated to display, along with a rich roster display of teleconference participants, information about resources and quality of experience of all respective client devices participating in a teleconference. In example embodiments, the participant list is displayed to the user of the client device via the client application.

Operational flow then proceeds to an operation 760, at which the client device queries the server device to determine if the teleconference is terminated. If it is determined at operation 760 that the teleconference is terminated, operational flow then proceeds to the end operation 735 which corresponds to termination of the example method 700.

If it is determined at operation 760 that the teleconference is not terminated, operational flow then proceeds to an operation 765 which corresponds to a predetermined time delay, dT. Following passage of the predetermined time delay dT, operational flow return to operation 705. In this manner, the example method 700 is periodic provided that the client device is not disconnected from the teleconference by virtue of operation 720 and that the teleconference remains in progress.

Figure 8:
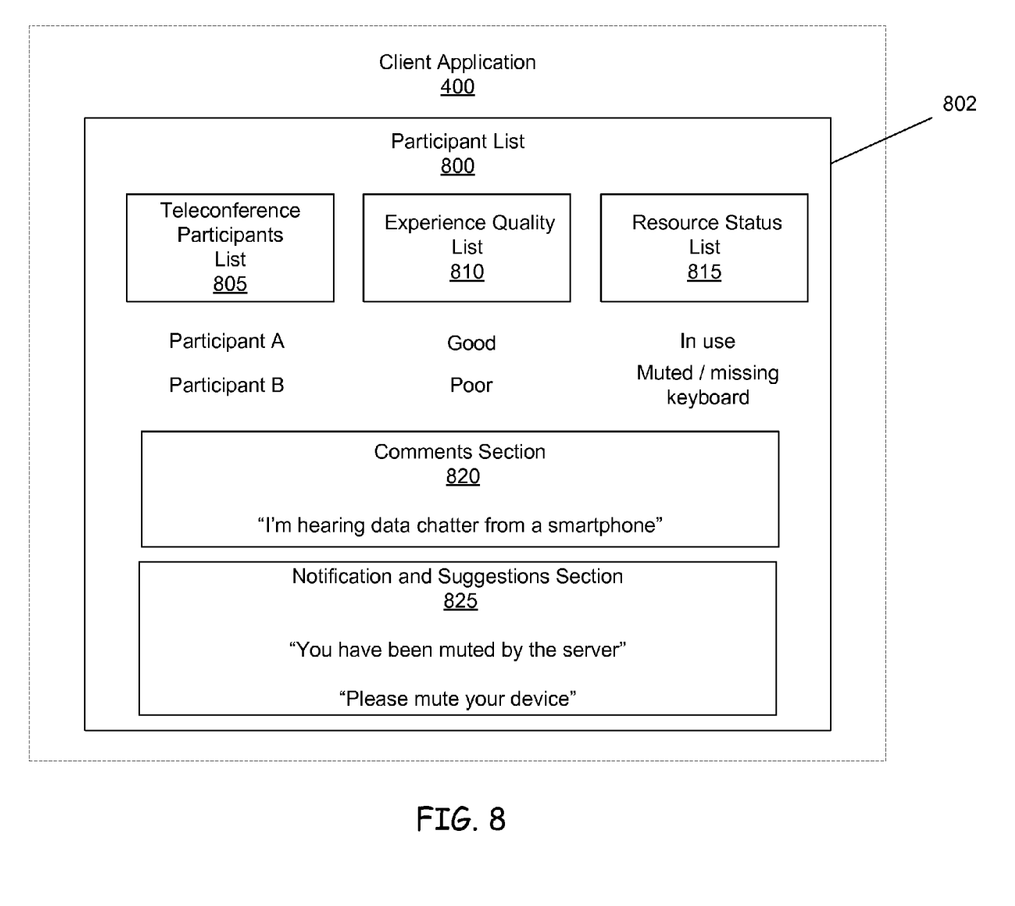
FIG. 8 shows an example conference user interface including a participant list.

Referring now to FIG. 8, an example participant list 800 is shown according to the principles of the present disclosure. As mentioned above, the example participant list 800 is configured to display information from the aggregate roster message to a user of the client device 105 via a user interface 802 associated with the client application 400. This information includes information about resources and quality of all respective client devices 105 participating in a teleconference. Other embodiments are possible as well. For example, the example participant list 800 is configured to be used in Peer to Peer calling applications and other applications such as collaborative sessions in a VOIP network as well. Still other embodiments are possible. In the example embodiment, the example participant list 800 is additionally configured to permit the user to manually enter quality of experience information related to perceived quality of audio of the teleconference and other quality of experience information.

The example participant list 800 may include a plurality of features such as, for example, a participant list 805, an experience quality list 810, a status list 815, a comments section 820, and a notification and suggestions section 825. Still other features are possible as well.

In some embodiments, the teleconference participant list 805 displays in a columnar manner a list of all participants connected to the teleconference. For example, the teleconference participant list 805 may list "Participant A" and "Participant B" as connected to the teleconference. In general, the teleconference participant list 805 may designate participants in any manner as desired such as, for example, via a textual designation, a graphical designation, and others. The graphical designation may generally include any geometry, tone and color as desired. Other embodiments of the teleconference participant list 805 are possible as well.

In some embodiments, the experience quality list 810 includes one or more designators displayed in columns that summarize teleconference quality of experience. For example a current state of audio quality being experienced by all participants may be listed in the teleconference participant list 805. For example, "Participant A" may be currently experiencing "Good" teleconference audio quality and "Participant B" may be currently experiencing "Poor" teleconference audio quality. In general, the one or more designators of the experience quality list 810 may be any type of visual status designator such as, for example, a textual designator, a graphical designator, and other types of designators. The graphical designation may generally include any geometry (e.g., icons or graphs), tone and color as desired. Still other embodiments of the experience quality list 810 are possible as well.

In some embodiments, the status list 815 includes one or more designators displayed in columns indicating the status of one or more resources of a client device by which the participants are connected to the teleconference. For example, a client device used by "Participant A" may be currently injecting audio into the teleconference such as, for example, by having a microphone enabled and "In Use." In contrast, the client device used by "Participant B" may not be currently injecting audio into the teleconference such as, for example, by having a microphone disabled and thus "Muted." Other embodiments are possible as well. For example, the status list 815 may include a designator indicating status of input devices of a client device such as a "missing keyboard" designator as show for "Participant B". In general, the one or more designators of the status list 815 may be any type of visual status designator such as, for example, a textual designator, a graphical designator, and other types of designators. The graphical designation may generally include any geometry, tone and color as desired. Other embodiments of the status list 815 are possible as well.

In some embodiments, the comments section 820 is configured to permit a participant to enter messages that are shared with all other participants of the teleconference. For example, a participant may enter the text "I'm hearing data chatter from a smartphone" in the example comments section 820. Other embodiments of the comments section 820 are possible as well.

In some embodiments, the section 825 is configured to render a message to a participant indicating that one or more actions have been applied to the respective client device to preserve audio quality of the teleconference. For example, the section 825 may display the message "You have been muted by the server" to a participant if it is determined that the client device is introducing undesired noise into the teleconference. Still other embodiments of the example participant list 800 are possible as well. For example, in some embodiments, the section 825 is configured to render a suggesting to a participant indicating that one or more actions may be implements to the respective client device to preserve audio quality of the teleconference. For example, the section 825 may display the message "Please mute your device" to a participant if it is determined that the client device is introducing undesired noise into the teleconference. Still other embodiments are possible as well.

In other examples, the user interface 802 can provide other functionality as well. For example, the user interface 802 can allow the user to select a command to update the participant list 800, including one or more of the teleconference participant list 805, the experience quality list 810, and the status list 815, at a desired time (i.e., on-demand), as opposed to allowing the user interface 802 to update periodically. In yet another example, the user can manually modify parameters shown by the user interface 802 (in accordance with security provisions). For example, the user can manually mute a participant by selecting the participant listed on the user interface 802. Other configurations are possible.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for updating information relating to a conference, the method comprising:
   acquiring resource information for a computing device, the acquired resource information including type, configuration, and performance of resources for the conference;
   acquiring quality of experience information for the computing device, the acquired quality of experience information including an audio quality;
   evaluating the acquired resource information and the acquired quality of experience information against a conference policy;
   generating a self-configuration message including the acquired resource information and the acquired quality of experience information; and
   sending the self-configuration message to a second computing device configured to manage the conference.

2. The method of claim 1, further comprising receiving an aggregate roster message from the second computing device, the aggregate roster message including each computing device connected to the conference.

3. The method of claim 2, wherein the aggregate roster message includes the acquired resource information and acquired quality of experience information of each computing device connected to the conference.

4. The method of claim 2, further comprising generating a user interface to display a participate list based on the aggregate roster message, the participate list including each computing device connected to the conference.

5. The method of claim 4, wherein the user interface includes a command for updating the participate list.

6. The method of claim 5, wherein the command in the user interface updates the participate list on-demand.

7. The method of claim 5, wherein the command in the user interface updates the participate list periodically.

8. The method of claim 6, wherein the participate list is periodically updated by periodically generating the self-configuration message including the acquired resource information and the acquired quality of experience information and periodically sending the self-configuration message to the second computing device configured to manage the conference.

9. The method of claim 1, further comprising receiving a suggestion from the second computing device to optimize the audio quality during the conference when the acquired resource information and the acquired quality of experience information are non-compliant with the conference policy.

10. The method of claim 1, wherein the self-configuration message is formatted as an extensible markup language message via an extensible control protocol used to control and manage the conference.

11. A method for updating information relating to a conference, the method comprising:
   acquiring resource information for a computing device, the acquired resource information including information relating to the conference;
   acquiring quality of experience information for the computing device, the acquired quality of experience information including an audio quality;
   evaluating the acquired resource information and the acquired quality of experience information against a conference policy;
   generating a self-configuration message including the acquired resource information and the acquired quality of experience information; and
   sending the self-configuration message to a server configured to manage the conference.

12. The method of claim 11, further comprising receiving an aggregate roster message from the server, the aggregate roster message including each computing device connected to the conference.

13. The method of claim 12, wherein the aggregate roster message includes the acquired quality of experience information for each computing device connected to the conference.

14. A computing device, comprising:
   a processing unit;
   a system memory connected to the processing unit, the system memory including instructions that, when executed by the processing unit, cause the computing device to perform the steps of:
   acquiring resource information for a computing device, the acquired resource information including type, configuration, and performance of resources for the conference;
   acquiring quality of experience information for the computing device, the acquired quality of experience information including an audio quality;
   evaluating the acquired resource information and the acquired quality of experience information against a conference policy;
   generating a self-configuration message including the acquired resource information and the acquired quality of experience information; and
   sending the self-configuration message to a second computing device configured to manage the conference.

15. The computing device of claim 14, wherein the computing device further performs the steps of:
   receiving an aggregate roster message from the second computing device, the aggregate roster message including each computing device connected to the conference.

16. The computing device of claim 15, wherein the aggregate roster message includes the acquired resource information and acquired quality of experience information of each computing device connected to the conference.

17. The computing device of claim 15, wherein the computing device further performs the steps of:
   generating a user interface to display a participate list based on the aggregate roster message, the participate list including each computing device connected to the conference.

18. The computing device of claim 17, wherein the user interface includes a command for updating the participate list.

19. The computing device of claim 18, wherein the command in the user interface updates the participate list on-demand.

20. The computing device of claim 18, wherein the command in the user interface updates the participate list periodically.

\* \* \* \* \*